(12) United States Patent
Bolin et al.

(10) Patent No.: US 8,750,864 B2
(45) Date of Patent: Jun. 10, 2014

(54) METHOD AND SYSTEM FOR CALL MANAGEMENT BASED ON GEOGRAPHICAL LOCATION

(75) Inventors: Johan Bolin, Spånga (SE); Ola Svensson, Lidingö (SE); Rogier Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 894 days.

(21) Appl. No.: 12/602,418

(22) PCT Filed: May 31, 2007

(86) PCT No.: PCT/SE2007/000531
§ 371 (c)(1),
(2), (4) Date: Nov. 30, 2009

(87) PCT Pub. No.: WO2008/147258
PCT Pub. Date: Dec. 4, 2008

(65) Prior Publication Data
US 2010/0197324 A1    Aug. 5, 2010

(51) Int. Cl.
*H04W 4/00*    (2009.01)
(52) U.S. Cl.
USPC ..... 455/432.3; 455/433; 455/466; 455/456.2; 455/404.2; 370/328; 340/995.25; 342/450
(58) Field of Classification Search
USPC .......... 455/404.2, 432.1, 435.1, 456.3, 414.2, 455/411, 420, 422.1, 450, 456.1, 466; 370/328–338; 379/37–51; 340/988–996; 342/450–465
See application file for complete search history.

(56) References Cited

U.S. PATENT DOCUMENTS

| | | | |
|---|---|---|---|
| 5,594,947 A | 1/1997 | Grube | |
| 6,230,017 B1 | 5/2001 | Andersson | |
| 6,745,023 B1 | 6/2004 | Offer | |
| 7,738,885 B2* | 6/2010 | Dufva et al. | 455/456.5 |
| 7,920,876 B2* | 4/2011 | Rahman | 455/456.1 |
| 8,180,365 B2* | 5/2012 | Toone | 455/456.1 |
| 2004/0229620 A1* | 11/2004 | Zhao et al. | 455/445 |
| 2005/0181808 A1 | 8/2005 | Vaudreuil | |
| 2006/0003775 A1* | 1/2006 | Bull et al. | 455/456.1 |
| 2006/0046746 A1 | 3/2006 | Ranford et al. | |
| 2007/0004378 A1* | 1/2007 | Muhonen | 455/404.2 |

FOREIGN PATENT DOCUMENTS

| | | |
|---|---|---|
| EP | 1 435 749 A1 | 7/2004 |
| WO | WO 03019907 A2 | 3/2003 |
| WO | WO 2006/002048 A2 | 1/2006 |

* cited by examiner

*Primary Examiner* — Quan M Hua (57) ABSTRACT

A method and a system for providing call management based on geographical location of an electronic communication device. Based on the location or rather a position area of the electronic communication device, a local policy is determined and is employed to a call service serving the electronic communication device.

13 Claims, 5 Drawing Sheets

METHOD AND SYSTEM FOR CALL MANAGEMENT BASED ON GEOGRAPHICAL LOCATION

TECHNICAL FIELD

The present invention relates in general to a method and apparatus for call management based on geographical location and in particular to method and apparatus for call service policy enforcement based on geographical location.

BACKGROUND

Mobile telephony has drastically changed the daily life for millions of people around the world. The mobile network and handsets enable voice and data communication and access to the Internet and services to a large extent whenever and wherever you are. People can thus reach each other at any time of day, simply by making a phone call using their mobile phone, one reason being that most people bring their mobile phones wherever they go. Similarly data can be communicated involving users having mobile phones.

Along with the ease to keep in touch, phone calls are being made at any occasion or event. This is however not only for good. There are occasions and locations where the use of communicating and access to services should be restricted, either as a result of legal restrictions or simply as a desire by an owner of facility or as a desire by the local community, to mention a few examples only.

A good example of this is prisons. In many countries, the fact that prisoners use mobile phones for planning escapes or managing criminal activities outside or inside the prison, is a rather big problem to society. The ability to set restrictions on how and by whom the communication network is used is also of interest in other national and public security contexts.

Another example, less harmful though, is the by many considered "bad etiquette" when an audience uses their mobile phone in cinemas, theatres, libraries, public transportation systems or during presentations or the like.

There is thus a demand for managing the access of services to and from users.

Most widely used solutions to the above sketched problem today are either using interceptors interfering the radio signals locally or trying to shield the radio antenna. Both of these solutions come with technically as well as economically big challenges. Besides they are also poor when it comes to flexibility and customization possibilities.

The interceptors work according to the principle to interfere the radio signals used by mobile phones in the area surrounding the interceptor. By transmitting an interference signal either when a mobile phone is detected or all the time, mobile phones in range of the interceptor will not succeed in establishing a connection. However, since a mobile phone is designed to handle interference from other radio sources and bad radio environments, interfering one is not always very simple.

Another problem with interceptors is that it is very difficult do perform selective interference. In principle, when using interceptors, mobile phone services, such as voice calls, messages, browsing, download etcetera either work or do not work. Achieving customizable interference, meaning that it would be possible to do emergency calls or for some users to use the mobile phone but not for others, is very difficult and extraordinary expensive. In addition, application of the interference may not be fully reliable.

Typically, the interference solution also consumes bandwidth unless the interceptor is very intelligent. This is the case both in the border area where the interface often is applied, but also for those users who may be allowed to use the access, if there are exemptions, for example for guards working in a prison referring to the prison example.

Interfering also means transmitting a relatively high power radio signal, depending on the desired interference range, which gives rise to a cost for the electrical energy feeding the interceptors, and also adds a potential though debated health risk for those within in the area subject to interference.

Another possible solution that may be used is shielding. This solution is totally uncustomizable and cannot separate emergency calls from other calls. Shielding all radio coverage means losing all connection to the network and hence all services. This must be considered a pure indoor alternative, and is an expensive solution. The high cost in deploying and maintaining the shield solution makes it only suitable for location with special requirements such as for small spaces with high requirement on interference from radio, such as laboratories, factories or special hospital wards.

There is therefore a need for a system and method, which enable solving the problem in a reliable and customizable way.

SUMMARY

An object of the present invention is to provide a method, a switching unit, a service control unit and a communication system for providing an improved call service.

According to an aspect, there is provided a method of switching of call service for a call involving an electronic communication device, in an electronic communications system, said method comprising the steps of:
  obtaining position area related information associated with the location of the electronic communication device;
  determining whether the position area of the electronic communication device is associated with an eligibility for a local policy; and
  employing call service by applying the local call policy for establishing a phone call, in dependence of the determination whether the position area is associated with an eligibility for a local policy, wherein said local policy defines the call service for calls from or to areas where the call service is to be employed.

Said switching of call service also may comprise sending to a service control unit a message comprising information that the position area is associated with eligibility for a local policy.

Said switching of call service also may comprise obtaining instructions of the local policy for employing the call service.

Said switching of call service also may comprise sending a message comprising radio related position related information associated with the location of the electronic communication device.

Said switching of call service also may comprise sending a message comprising GPS or MPS related position information associated with the location of the electronic communication device.

According to another aspect, there is provided a switching unit being arranged for switching of call service for a call involving an electronic communication device, said switching unit comprising a first application unit being arranged to obtain position area related information associated with the location of the electronic communication device and arranged to determine whether the position area of the electronic communication device is associated with eligibility for a local policy, a second application unit operatively connected to the first application unit, the second application unit being arranged to employ the call service by applying the local call policy, in dependence of the determination whether the position area is associated with an eligibility for a local policy, wherein said local policy defines the call service for calls from or to areas where the call service is to be employed.

The second application unit of the switching unit may further be adapted to be connected to a service control unit and may be arranged to send to the service control unit a message comprising information that the position area is associated with eligibility for a local policy.

The second application unit of the switching unit may further be arranged to obtain instructions of the local policy for employing the call service.

The second application unit of the switching unit may further be arranged to send a message comprising radio related information associated with the location of the electronic communication device.

The second application unit of the switching unit may further be arranged to send a message comprising GPS or MPS related information associated with the location of the electronic communication device.

In a further aspect, there is provided a method of controlling of call service for an electronic communication, where said electronic communication device is located within a position area, within an electronic communications system, said method comprising:
  receiving a message comprising information that the position area of the electronic communication device is associated with an eligibility for a local policy,
  determining whether the entire position area is associated with the local policy, and
  supplying said local policy if the entire position area is associated with a local policy, wherein the local policy defines the call service for calls from or to areas where the call service is to be employed.

The method of controlling of call service may further comprise retrieving policy information associating the position area with at least one area associated with a local policy.

The method of controlling of call service may further comprise requesting further position related information in dependence of the determination whether the entire position area is associated with the local policy.

The step of receiving within the method of controlling of call service, may further comprise receiving a message comprising radio related position related information associated with the location of the electronic communication device.

The step of receiving within the method of controlling of call service, may further comprise receiving a message comprising GPS or MPS related position information associated with the location of the electronic communication device.

The method of controlling of call service may further comprise supplying normal call handling instructions to a switching unit if the entire position area is not eligible for a local policy.

The method of controlling of call service may further comprise supplying call handling policy instructions to a switching unit if the entire position area is associated with a local policy.

According to a still further aspect, there is provided a service control unit being arranged for controlling a call service for a call involving an electronic communication device, said service control unit being arranged to receive a message comprising information that the position area of the electronic communication device is associated with an eligibility for a local policy service, to determine whether the entire position area is associated with a local policy, and further being arranged to supply said local policy if the entire position area is associated with the local policy, wherein the local policy defines the call service for calls from or to areas where the call service is to be employed.

The service control unit may further be arranged to retrieve policy information associating the position area with at least one area associated with a local policy.

The service control unit may further be arranged to request further position related information in dependence of the determination whether the entire position area is associated with the local policy.

The service control unit may further be arranged to receive from a switching unit a message comprising radio related position related information associated with the location of the electronic communication device.

The service control unit may further be arranged to receive from a switching unit a message comprising GPS or MPS related position information associated with the location of the electronic communication device.

The service control unit may further be arranged to supply normal call handling instructions to a switching unit if the entire position area is not eligible for a local policy.

The service control unit may further be arranged to supply call handling policy instructions to a switching unit if the entire position area is associated with a local policy.

According to a yet further aspect, there is provided a method of providing a call service for a call involving an electronic communication device, said method comprising the steps of:
  obtaining position area related information associated with the location of the electronic communication device;
  determining whether the entire position area is associated with the local policy, and
  employing call service by applying the local call policy for establishing a phone call, in dependence of the determination whether the position area is associated with an eligibility for a local policy, wherein said local policy defines the call service for calls from or to areas where the call service is to be employed.

According to still another aspect, there is provided an electronic communication system for providing a call service for a call involving an electronic communication device, said system comprising:
  a switching unit arranged to be operatively connected to an electronic communication device, said switching unit being adapted to obtain position area related information associated with the location of the electronic communication device and arranged to determine whether the position area of the electronic communication device is associated with eligibility for a local policy, and
  a service control unit operatively connected to said switching unit, said service control unit being adapted to determine whether the entire position area is associated with a local policy, and further being arranged to supply said local policy to the switching unit if the entire position area is associated with the local policy, such that the switching unit can employ the call service by applying the local call policy, wherein the local policy defines the call service for calls from or to areas where the call service is to be employed.

It should be emphasized that the term "comprises/comprising" when being used in the specification is taken to specify the presence of the stated features, integers, steps or components but does not preclude the presence or addition of one or more other features, integers, steps or components or groups thereof.

BRIEF DESCRIPTION OF THE DRAWINGS

In order to explain the invention and the advantages and features thereof in more detail, embodiments of the invention will be described below, references being made to the accompanying drawings, in which.

DETAILED DESCRIPTION

In the following a few basic concepts will be explained and different scenarios discussed. Focus is directed on the GSM communication system. However, the concepts being explained equally well apply to Universal Mobile Telecommunications System (UMTS), and may also at least in part be applied to General Packet Radio Service (GPRS) although a few modifications would have to be made.

Various embodiments of the present invention will be outlined below. These embodiments will at least be related to the Intelligent Network (IN) solution of implementing call services within a communications network.

Referring to the background, the different locations and scenarios would also require somewhat differently applied solutions. A technical solution should hence enable service policies from various locations and users to be customized to serve what is requested, for a particular location, occasion or scenario.

In the prison scenario, the policies may be rather tough, simply disallowing all incoming and outgoing phone calls to and from, respectively, all mobile phones, with an exception for those mobile phones on a white list, belonging to the personnel working at the prison, and even then possibly also with access granted after successfully entering a password or a personal prefix. The policies may also include logging phone calls and possibly recording them.

In the cinema-like scenario, the policies may rather be disabling voice calls but letting Short Message Service (SMS) messages go through or simply a voice or text message to a user calling someone at the cinema that the person you are calling is in a cinema followed by the choice to either pursue or terminate the phone call.

Common for all scenarios is however that it is most likely that emergency calls shall be let through.

The solution as such may also be applied for other services than call control, such as charging, Quality of Service (QoS), but also general service provisioning.

A more detailed explanation of the concept of the present embodiments starting with Mobile Originated (MO) calls continued by Mobile Terminating (MT) calls will now follow.

Mobile Originated Calls

When a GSM user establishes a call, that is when the call is originated by the mobile station (MS), radio communication is established between the MS of the user and the network. The MS sends a Direct Transfer Application Part (DTAP) Setup message to the Mobile Switching services Centre (MSC). This DTAP Setup message is transported transparently through the Base Transceiver Station (BTS) and the Base Station Controller (BSC) of the user and contains the current cell identity (ID) of the MS. This Cell ID identifies the cell in the radio access network currently serving the MS. The MSC may thus use the Cell ID of the subscriber for the call establishment process.

The MS, in accordance with the GSM standard, will maintain a list of neighbouring Cell IDs, which Cell IDs are regularly reported to the BSC, enabling the BSC to facilitate handover from the current Cell to one of these neighbouring Cells. For the purpose of the present embodiments, the MSC also needs to receive or in other ways have access to this list of neighbouring Cell IDs. Two methods of accessing the neighbouring Cell IDs by the MSC are exemplified down below.

Automatic Inclusion of Neighbouring Cell ID by BSC

Certain BSC(s) will control one or more BTSs that at least in part cover an area in which a local service policy may be applied. Those BSCs are equipped with special functionality to include the neighbouring cell information in each DTAP Setup message. This functionality in the BSC, to populate DTAP Setup messages with additional Base Station System (BSS) information, i.e. above-mentioned neighbouring cell information, is currently available from Ericsson. In addition, the BSC may include the timing advance currently used by the BTS for the communication with the MS. The timing advance may be used to calculate the distance between the BTS and the MS. In this manner the BSC provides the MSC with detailed information related to the position of the calling subscriber.

According to the present embodiments, the MSC receives, by administrative action, position information such that it can maintain a list of cells that are eligible for a local policy. If the calling subscriber's current Cell ID, as received in the DTAP Setup message, is found to be present in this list, the MSC can determine whether additional position information is required or not, in dependence of the particular Cell ID. If the current Cell ID is not included in this list the MSC will continue call handling as per normal.

MSC-Initiated Request for Cell-ID

For other BSCs than the ones for the last two paragraphs above, the BSC will not include additional location related information in DTAP Setup. The MSC will thus receive only the current Cell ID of the calling subscriber. If the calling subscriber's current Cell ID, received in DTAP Setup message is present in above-mentioned list of cells that are eligible for a local policy, the MSC requires additional, location related information. The MSC therefore issues a request to the BSC to provide said additional location related information.

This request from the MSC, or the Serving GPRS Support Node (SGSN), to BSC is the "perform location request" Base Station System Application Part (BSSAP) message. It is worth mentioning that Ericsson GSM network has the capability for the MSC to obtain this information from the BSC.

When the BSC has provided the requested information, the MSC sends position information in Location Information message including a so called Radio Report based on the obtained additional location related information, to the service control point (SCP) connected to the MSC.

The choice between automatic inclusion of neighbouring Cell IDs by BSC on the one hand and the MSC initiated request for additional information, on the other hand, depends on the number of BSC and cells that an MSC controls and on the ratio of calls from or to cells included in the mentioned list of cells eligible for a local policy versus calls from or to cells that are not included in said mentioned list of cells eligible for a local policy.

Intelligent Network (IN) Service Triggering

In the following two examples or service triggering will be disclosed, one of which concerns the case where the calling subscriber does not subscribe to an IN service for MO calls establishment, and the other concerns the case for which the subscriber subscribes to an IN services for MO call establishments.

Where the subscriber is not an IN subscriber, the traffic handling process in the MSC may comprise a few application module instances, being examples of application units.

Figure 1:
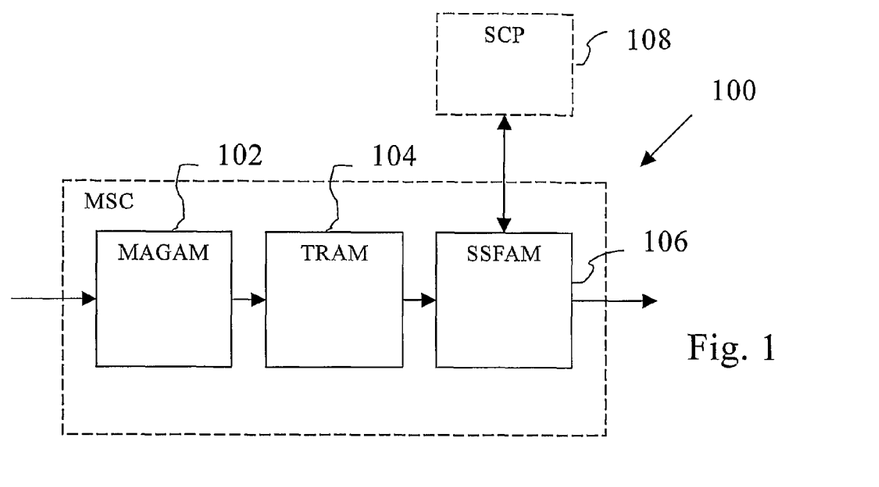
FIGS. 1 and 2 are block diagrams illustrating embodiments of a switching unit, a service control unit and a system thereof.
Figure 2:
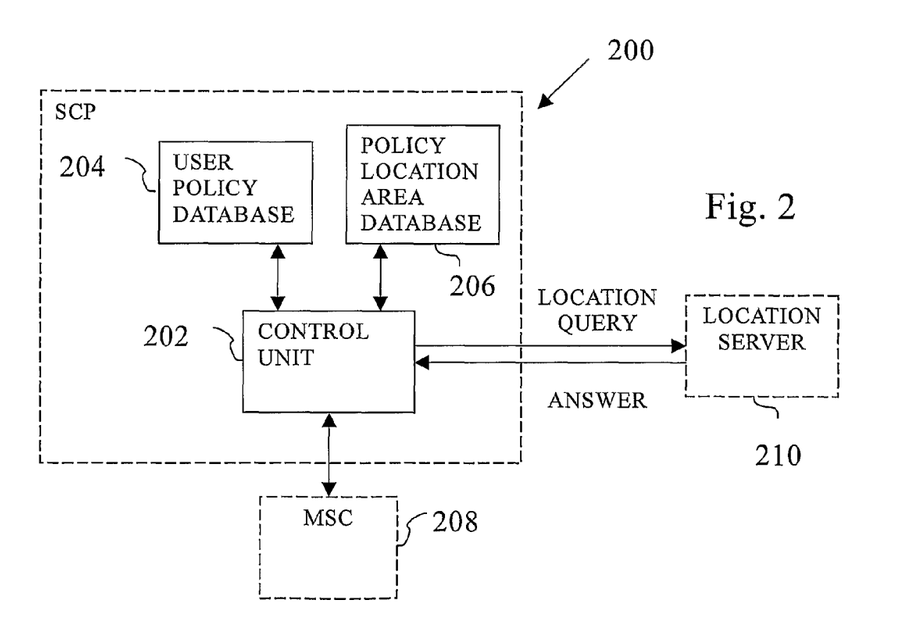

Reference will from now on be given to FIGS. 1 and 2 being block diagrams illustrating embodiments of a switching unit, a service control unit and a system thereof.

The block diagram of FIG. 1 illustrates an MSC 100 and SCP 108, where the MSC 100 is adapted to be connected to said SCP 108. The MSC 100 comprises a Media Access and Gateway MSC Application Module (MAGAM) 102 connected to a Traffic Application Module (TRAM) 104 that further is connected to a Service Switching Function (SSF) Application Module (SSFAM) 106. It is the SSFAM of the MSC, which is adapted to be connected to a SCP 108. The function of the various application modules is discussed down below.

Moreover, the block diagram of FIG. 2 illustrates a SCP 200 being adapted to be connected to a MSC 208 and to a location server 210. The SCP 200 according some embodiments comprises a control unit 202, a user policy database 204 connected to the control unit 202, and a policy location area database 206 also connected to the control unit 202. The function of the comprising units of the SCP and the interaction with the MS as well as the location server will be described below.

According to a first example wherein the subscriber is not an IN subscriber, the MAGAM instance 102 receives the DTAP Setup and determines based on the Cell ID of the calling subscriber that the subscriber resides in a cell for which its Cell ID is included in the list of cells eligible for a local policy. An instance of the MAGAM 102 then obtains additional location related information for which one of the earlier explained two different methods for reporting the neighbouring cells to the MSC, that is automatic inclusion of neighbouring Cell IDs by BSC or MSC-initiated request for Cell ID, may be used.

Triggering of the IN service such that the policy service for the area associated with it is applied is performed in accordance with standard mechanism. MAGAM 102 forwards the call to an instance of the TRAM 104, after which TRAM forwards the call to an instance of the SSFAM 106. The SSFAM 106 invokes the restricted area policy service by sending a service request message to a Service Control Function (SCF) residing in the SCP 108. The SCF is a service execution platform, capable of executing IN services.

The Open Intranode Protocol (OIP) may be used for signaling between the instances of the Application Modules (AM) in the MSC. For call establishment, MAGAM 102 sends OIP Initial Address Message (IAM) towards TRAM 104, which forwards the message to SSFAM 106. One parameter that is included in this OIP IAM is position information of the type of the Location Information.

For calls that require invocation of the local policy service, the Location Information needs to contain the additional parameter, the "Radio Report". Said Radio Report that was received from the BSC may be contained in the Extension container inside the Location Information, to mention one example only.

Thereafter, an instance of the SSFAM 106 may include the Location Information, comprising the Extension Container containing the Radio Report, in the initial detection point (IDP) operation. An instance of the SSFAM 106 then sends the IDP operation to the SCP 108. The SCP 108 may use the radio Report to determine whether the calling party resides in a position area for which the entire position area is associated with a local policy. If it is found that the entire position area falls within the area for which a local policy applies, said policy is applied to the call from the calling party.

According to a second example wherein the subscriber is an IN subscriber the MAGAM 102 takes similar actions as in previous call example, and determines based on the Cell ID of the calling subscriber that the subscriber resides in a cell for which its Cell ID is included in the list of cells eligible for a local policy.

In particular, the user has Originating CAMEL Subscription Information (O-CSI) in her profile in the VLR, for which reason the MSC 100 triggers the subscribed Customized Applications for Mobile network Enhanced Logic (CAMEL) service as per standard. MAGAM 102 will include in the OIP IAM an indication that after the subscribed IN service, an additional switch based IN service needs to be invoked, namely the local policy service. The above-described sequence of IN service triggering, that is the first subscribed IN service, followed by switch based service, is standardised in CAMEL Phase 3. CAMEL does not specify which criteria shall be used to determine whether a switch based IN service shall be invoked or not. Hence, the triggering of the restricted area policy service after the invocation of a subscribed CAMEL service, is in accordance with the CAMEL standard.

Triggering of the local policy service after the invocation of a subscribed CAMEL service entails a second instantiation of the SSFAM 106, referred to as SSFAM(2).

Hence, SSFAM(2) will trigger the local area policy service. The local area policy service will not know (and does not need to know) whether a subscribed IN service was triggered for this call or not. If no subscribed IN service was triggered for this call, then there will typically be just one SSFAM instance 106 instead of two SSFAM instances.

The OIP IAM then carries the Location Information with the Radio Report. The Radio Report contains the list of neighbouring Cell IDs and the timing advance for the current Cell. The SSFAM(2) can therefore include that information in the Initial Detection Point (IDP) Operation. The SSFAM(2) then sends the IDP operation to the SCP 108, to invoke the local area policy service.

If the local area policy service decides that the call is not allowed, then the service sends a Release Call operation to the MSC 100.

MT Calls

When a GSM user receives a call, that is when the call is terminated by the MS, a radio communication is established between the network being used and the user. A Mobile Application Part Provide Roaming Number (MAP PRN) message containing the International Mobile Station Identifier (IMSI) number of the called subscriber is sent from the HLR to the Visiting MSC (VMSC) of the visiting network for the called subscriber. The VMSC will, upon receiving the MAP PRN message, allocate a Mobile Station Roaming Number (MSRN) and return it to the HLR, which forwards the MSRN to the Gateway MSC (GMSC). The GMSC sends an Integrated Service Digital Network (ISDN) User Part (ISUP) Initial Address Message (ISUP IAM) to the VMSC, containing the MSRN. When the VMSC receives the ISUP IAM containing the MSRN, it sends a DTAP Setup message to the MS. At this moment the current Cell ID of the called subscriber is not yet known by the VMSC. The serving MSC only knows the Location Area (LA) of the subscriber, where the LA is an indication of the BSC or group of BSCs. Hence the subscriber is located in a cell that is served by the BSC or by one BSC of the group of BSCs.

Location information of the subscriber may be provided to the VMSC in a few different ways, for instance during the allocation of a roaming number for the subscriber, before the call establishment and at alerting the MS by the VMSC.

Location Verification when Allocating a Roaming Number

When the VMSC receives the MAP PRN message from the HLR, it verifies the LA of the subscriber. If the LA of the subscriber is recognised by the VMSC, as a position area eligible for a local policy service, then the VMSC performs "pre-paging" for the subscriber.

Pre-paging is a method that may be applied before the allocation of a Mobile Station Roaming Number (MSRN). Pre-paging is used to prevent that an MSRN is allocated for a subscriber when the subscriber is not reachable for paging.

By applying pre-paging the current location of the subscriber can be obtained. The VMSC may include a request to provide a detailed location report of the subscriber in the pre-paging instruction. In this manner the VMSC obtains the location information from the BSC, which the SCP, after having received said location information from the VMSC, to determine whether the subscriber currently resides in a position area being entirely associated with a local policy service.

If the subscriber currently resides in a position area for which the local policy service means restricting phone calls, then the VMSC will not allocate an MSRN for this call. The VMSC then sends in a MAP PRN response a negative result to the HLR. The HLR will in turn return in a MAP Send Routing Information (SRI) response a negative result to the GMSC, for which reason the GMSC will not establish the call.

The methodology as described above of determining the location of the subscriber during allocation of the MSRN has the advantage that it prevents the call establishment attempt that is used in the following method whereby the VMSC performs location verification when receiving the ISUP IAM with the MSRN.

Location Information Provision Before Call Establishment

When the VMSC has received an ISUP IAM containing an MSRN, the VMSC knows the LA of the called subscriber when the VMSC is handling terminating call establishments. Before continuing handling the call, the VMSC may request detailed location information report from the BSC for this subscriber using the Perform Location Request BSSAP message. If the location report indicates that the subscriber resides in a cell whose Cell ID is included in the list of cell eligible for a local policy, the VMSC uses the detailed location report and sends it to the SCP to determine whether the called subscriber currently resides in an area for which a local policy service is associated to the entire area. If the subscriber resides in an area for which a restricted policy shall be applied throughout, the VMSC releases the call, after having received information from the SCP.

The detailed information report is obtained by the VMSC, in which the TRAM instance forwards it to the MAGAM instance. When MAGAM has obtained the detailed location report from the BSC and has determined that the subscriber may reside in a restricted area, that is in an area eligible for a local policy, the MAGAM performs a Diameter verification towards the SCP. The Diameter (see IETF RFC 3588 "Diameter") is a protocol used to authenticate subscribers, authorize service and charge the subscriber.

Due to the absence of any defined method for invoking a serving network based IN service at this stage of the call establishment, one method is to use Diameter. Diameter allows for query-response type of verifications. The Diameter query contains the detailed location report of the subscriber. The SCP may respond with an indication whether the call is allowed or not.

Location Provision at Alerting

After receipt of the ISUP IAM containing an MSRN, by the VMSC, that is when the VMSC is handling the terminating call, the VMSC may page the subscriber and may send a DTAP Setup to the MS. When MS accepts the call, MS sends DTAP Alerting to the VMSC. This process of paging the subscriber includes, amongst others, that the current location of the subscriber, including the cell ID of the MS, is reported to the VMSC at DTAP Alerting.

Before the VMSC sends the paging signal to the BSC, the MSC should determine whether the current location of the called subscriber is a LA that is eligible for a local policy. In the case the current LA of the called subscriber is eligible for a local policy, the VMSC should include in the paging request to the BSC, a request to include the detailed location report in the paging response. When the VMSC receives the paging response, it can send the position information to the SCP to determine whether the called subscriber currently resides in an area for which a local policy shall be applied. If the subscriber is found to reside in an area of a restricted policy, the VMSC releases the call, depending on instructions from the SCP. The MS may have been alerting for a short period, e.g. 1 second, but the call will not be connected through but will be released, again depending on instructions from the SCP.

Call Recording

By applying call recording, the serving network based CAMEL service that is described for mobile originated call establishment, may be enhanced as follows. When the CAMEL service has determined that the calling subscriber resides in an area, for which a restricted policy shall be applied, the service may decide that the call is allowed to continue, but that the call shall be recorded. The SSFAM of the VMSC relays the instruction as received from the SCP to record the call on to a Media Gate Way (MGW). The MGW will then connect a recording device to the media stream.

The section above describes how call recording may be performed for an MO call that is established from a restricted area. Call recording could however also be performed for a terminated call that is received in a restricted area.

Above it has been discussed how to apply local policies in dependence of the current location of a subscriber upon establishment of a call session.

If a subscriber changes location from a first local policy area to another local policy area, the local policy of the first local policy area is maintained in the IN implementation, the reason being that the change of location is not reported to the SCP.

It should be mentioned that the determination of a position area may be assisted by using directional antennas, distributed antenna systems or radio beacons, which further define the call plan such that the a high accuracy position area determination having high confidence may be obtained.

Figure 3:
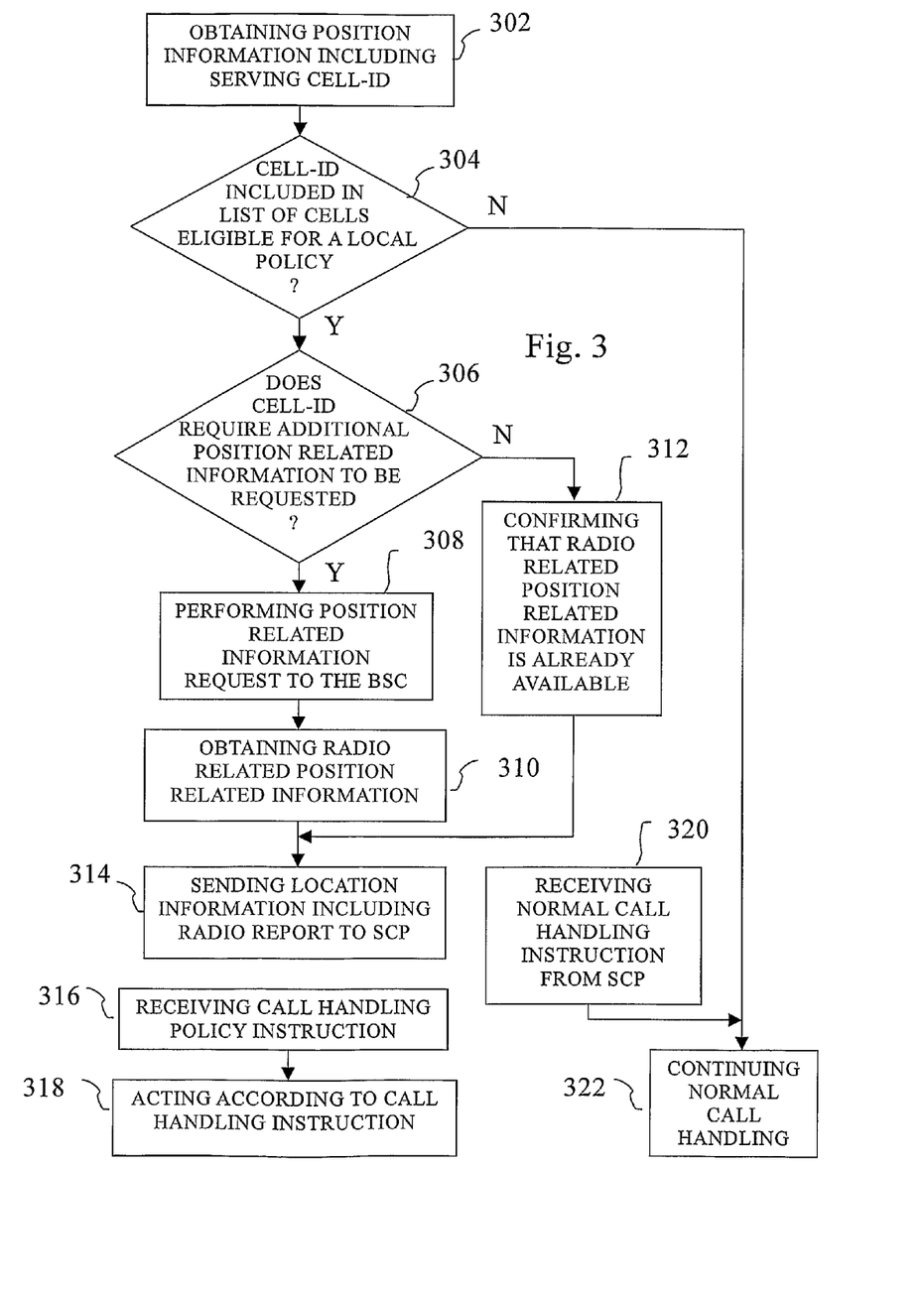
FIGS. 3, 4, 5A and 5B are flowcharts illustrating embodiments of method steps.
Figure 4:
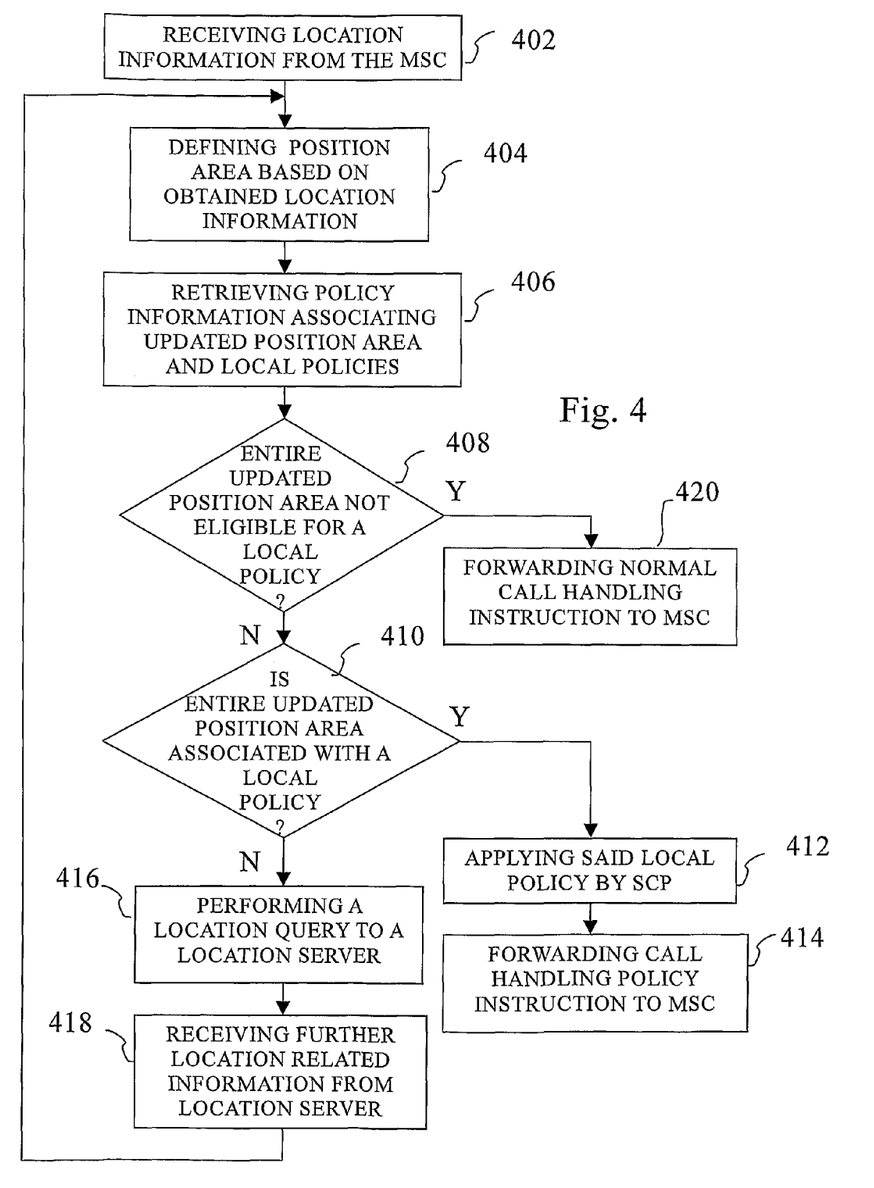
Figure 5A:
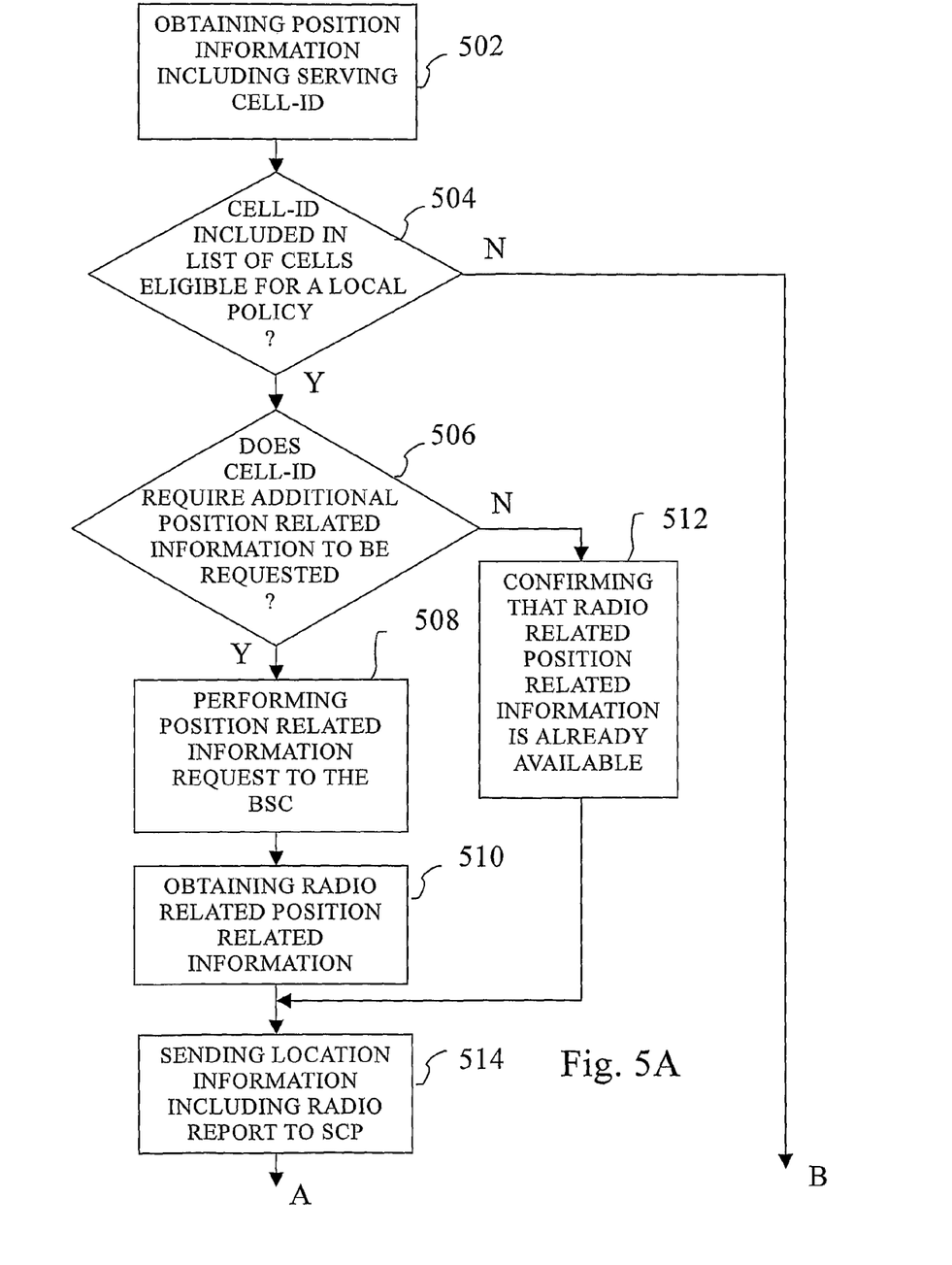
Figure 5B:
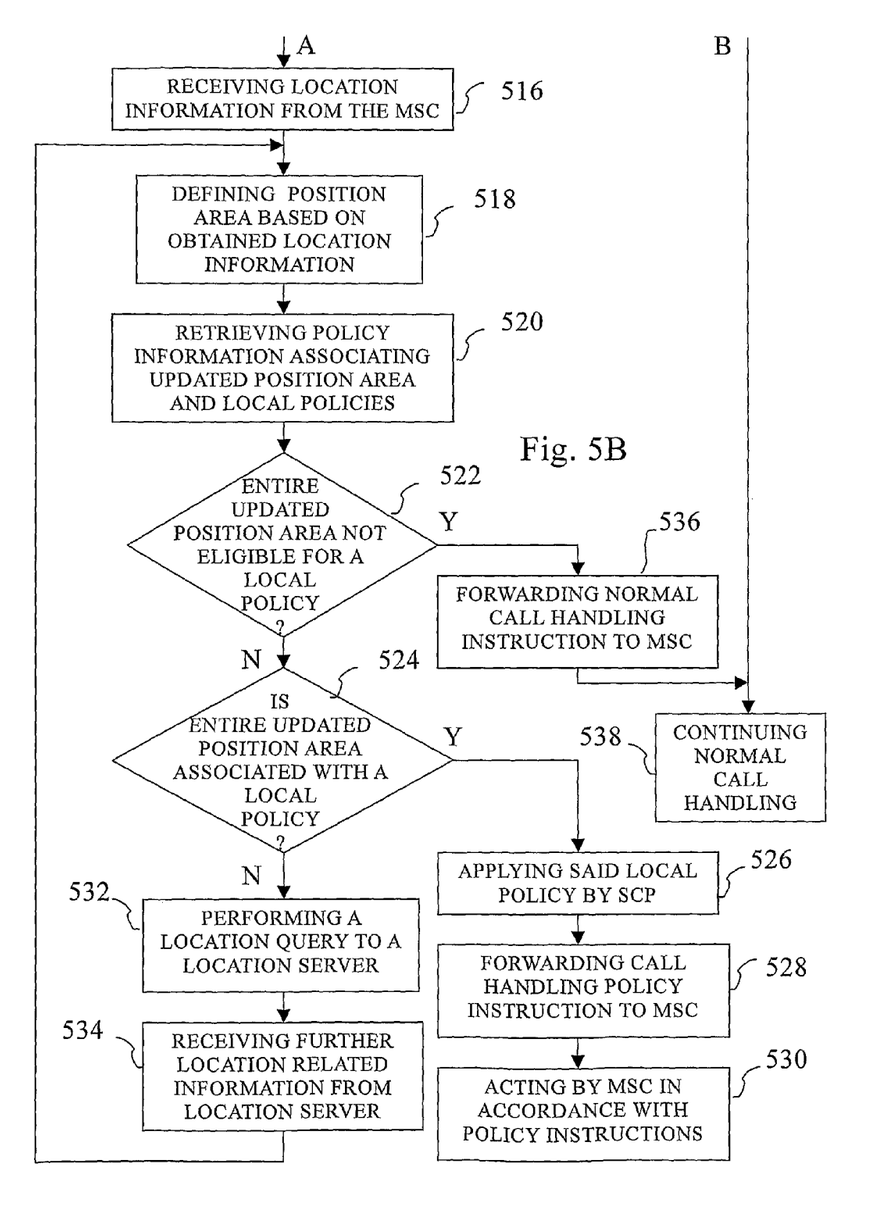

Below, the methods and devices according to some embodiments of the present invention will be explained with reference to FIGS. 3, 4, 5A and 5B. FIG. 3 is a flowchart illustrating method steps of a method for switching of call service for a call involving an electronic communication device, whereas FIG. 4 is a flowchart illustrating method steps of a method for controlling call service for a call involving an electronic communication device. FIGS. 5A and 5B show a flowchart illustrating method steps of a method for providing call service for a call involving an electronic communication device, according to some embodiments of the present invention.

For this reason the method steps of FIGS. 3 and 4 are to a large extent also present in the flowchart of FIGS. 5A and 5B. Therefore, reference will be given to the method steps in more than one figure at a time.

In order to facilitate connecting step numbers to the flowchart figures, all steps present in FIG. 3 have numbers starting with 3, for instance step 302 and step 304. Similarly, steps in FIG. 4 have numbers such as step 408 and steps in FIGS. 5A and 5B numbers like step 520 and step 528.

As was explained earlier, the VMSC can obtain position information including the serving cell-ID of the MS, steps 302, 502, which renders the VMSC access to the cell ID of the calling party upon call establishment. The MSC thus determines whether the cell-ID is included in a list of cells being eligible for a local policy, for instance by checking whether the Cell-ID is included in said list. This list specifies the specific areas in the form of cells for which a local policy may be employed to either a calling or a called party residing in said area.

Examples of local policies are QoS dependent on location of the calling party, charging enabling using special offers when visiting restricted areas, allowing a user to be alerted when residing in an area of a local policy etcetera.

If it is determined that the serving cell-ID for the MS is included in the list of cells eligible for a local policy in steps 304, 504, that is by answering yes (Y) to said query, the MSC further determines whether the Cell-ID requires additional position related information to be requested by the MSC, or not, in steps 306, 506. Since the Cell-ID was found to be included in the list in steps 304, 504, the serving cell is eligible for a local policy.

However, the entire cell may not be eligible to a local policy. In order to determine whether the call from a calling party or the call to a called party in reality is eligible to local policy or not, the position of the party resident in the serving cell-ID, has to be defined more accurately, that is the granularity of the position has to be improved. For this purpose additional position related information is often needed. In steps 306, 506 it is thus determined whether such additional position related information should be requested or not. If the MSC determines that such additional position related information should be requested, meaning that such information is not already available to the MSC, the MSC performs a position related information request to the BSC, in steps 308, 508.

By performing such a request to the BSC, the MSC expects radio related information containing for instance Time of Arrival (TOA), Timing Advance (TA) and a group of neighbouring cells, derived from the Base Station System (BSS). In the subsequent step, steps 310, 510, the MSC obtains such radio related position information.

In the case it is determined that the MSC does not have to request additional position related information based on the cell-ID, in steps 306, 506, that is by answering no (N), it is being confirmed in a following step, steps 312, 512 that radio related position related information is already available to the MSC.

One possibility to already have access to the radio related information or additional BSS information, is that such information is provided by the BSC populating the DTAP Setup message where such information is used by the BTS for the communication with the MS.

In short, the radio related information is needed and for some cell-IDs such information is already available by the MSC and for other Cell-IDs such information has to be requested.

Having obtained radio related information either explicitly in steps 310, 510 or implicitly in steps 306, 506 by finding that such information is already available, this radio related information is included in a radio report that is sent to the SCP in the Location Information, in steps 314, 514. Said Location Information, in turn, may be included in an Initial DP operation or may be included in a designated Diameter message.

Whereas the numbering of steps in the flowchart illustrating method steps for providing call service in FIGS. 5A and 5B continues consecutively, step 314 performed by the MSC according to some embodiments of the present invention is continued by step 402, in which the SCP receives location information from the MSC.

The steps following steps 314, 514 of the methods of relating call service are thus step 402 and 516 that each is executed by the SCP, and comprises receiving Location Information from the MSC, which Location Information contains the radio report. Having obtained the additional position related information the SCP defines the position area based on the obtained location information, in steps 404, 518. Taking additional position information into account when determining the position area the position area will be better defined, that is the granularity will be improved. The uncertainty of the physical location of the calling or called party resident in the cell-ID is thus decreased.

In order to relate the defined position area to an area in which a local policy should be applied, the SCP performs retrieving policy information associating updated position area and local policies, in steps 406, 520. For this purpose the SCP consults the Local Policy Enforcement (LPE) and the Location Determination Function (LDF) both contained in the SCP, wherein the LPE comprises various policies and the LDF may update the calculated position area of the electronic communication device.

The SCP then determines whether the entire updated position area is not eligible for a local policy, in steps 408, 522. Since the position area has been better defined it may here be determined that for the improved granularity it may be determined that the updated position area falls outside areas that are eligible for a local policy.

If however it is determined in steps 408, 522 that not the entire position area is not eligible for a local policy, meaning that at least one part of the entire position area is eligible for a local policy, the SCP continues to determine whether the entire position area is associated with a local policy or not, in steps 410, 524. If at least one part is associated with a local policy, there are thus the alternatives of either the entire updated position area being associated with a local policy or not the entire updated position area being associated with a local policy. If the SCP determines that not the entire updated position area is associated with a local policy area in steps 410, 524, the SCP will perform a location query to a location server, in steps 416, 532, in order to gain further position related information to further improve the granularity of the position area(s).

Location severs are known to the person skilled in the art and are therefore not further discussed here.

Provided that the location query is successfully responded to, the SCP receives further location related information from the location server, in steps 418, 534.

Having received further location related information, the SCP again defines the position area based on the obtained location information, in steps 404, 518. The uncertainty of the physical location of the calling or called party, is thus further decreased. The step of retrieving policy information, associating the updated position area and the local policies, is then performed by the SCP, in steps 406, 520. Accordingly, step 408, 522 is executed next by determining whether the entire updated position area is found not to be eligible for a local policy. Again if the SCP cannot determine that the entire updated position area is not eligible for local policy in step 408, 522, the SCP continues and determines whether the entire updated position area is associated with a local policy, or not, again in step 408, 524.

At this stage, the SCP may find that the entire updated position area is associated with a local policy in step 408, 524, after which the SCP performs applying said local policy, in step 412, 526, which policy the position areas was found to be associated with. Once having applied the certain local policy by the SCP, the SCP forwards the call handling policy instructions corresponding to the applied local policy, to the MSC, in step 414, 528.

The flowchart in FIG. 3 illustrating method steps of controlling of call service is now continued by receiving call handling policy instruction in step 316. The subsequent step of the flowcharts is then the step of acting in accordance with the policy instructions, step 318, 530, which step is being performed by the MSC that received the instructions.

However, if it was determined that the entire position area is not eligible for a local policy in step 408, 522, performed by the SCP, the SCP subsequently forwards normal call handling instructions to the MSC, in step 420, 536. After the MSC has received the normal call handling instructions from the SCP, in step 320, the MSC continues normal call handling, in step 322, 530 since the position area was found not to be eligible for a local policy according to this method.

Similarly, if the SCP already in step 304, 504 determined that the cell-ID was not included in the list of cells eligible for a local policy, the MSC simply continues normal call handling according to step 322, 538, as shown in FIGS. 3, 5A and 5B.

It should be understood that the presented embodiments of the present invention are only a few examples of the variety of embodiments that are comprised within the present invention.

According to some embodiments of the present invention the call service also includes the case for which it is detected that a subscriber resides inside an area for which a local policy applies, which policy comprises providing a call service in the form of establishing a phone call to the subscriber residing in the area for which the policy shall be applied. This scenario could be used as a method for communicating early warnings to subscribers in case of leakages or detections of pollutants that are harmful to humans. Also, warnings could be communicated in the case of approaching bad weather such as hurricanes, typhoons, and snowstorms or the like, or events caused by displacements or movements of continental plates, such as earthquakes, tsunamis and the like.

In the particular case of tsunamis, tsunami detection systems may be used to determine the origin and the magnitude of the tsunami. Possibly with assistance from seismological stations positioned at various places around the world, the tsunami detecting system comprising a number of detection points would also determine the instant of time for the event causing the tsunami. Knowing the time of origin of the event, an expected time of arrival of the tsunami at various shores could be calculated. The call service may thus comprise communicating a warning to subscribers in wide areas surrounding the origin of the tsunami in dependence of the distance from the tsunami origin.

In the tsunami scenario position related information may be obtained from tsunami detection systems but may also at least indirectly be obtained from position detection systems such as the Global Positioning System (GPS).

Position related information associated with mobile phones may thus be obtained from other sources than the communications network, especially the BSC and BTS able to communicate with the mobile phone. The GPS system is one such example.

The present embodiments also comprise examples and scenarios for which position related location information may be obtained by using Mobile Positioning Systems (MPS) but also by making use of triangulation utilizing various position references. Examples of determining position information using MPS are Cell Global Identity and Timing Advance (CGI-TA), which determines the distance from a BTS to a mobile phone by using the timing difference from sending until receiving, Enhanced Observed Time Difference (E-OTD) which uses triangulation with BTSs using signal bursts from the BTSs and calculates the timing difference between bursts, and Uplink—Time of Arrival (UL-TOA), which resembles the E-OTD being the timing difference between signal arrival to the three BTSs that is determined.

Moreover, according to some embodiments of the present invention, the Assisted Global Positioning System (A-GPS), being a system for which the GPS is used together with an assisting signal provided by the communication network, which typically improves the GPS positioning in terms of required time as well as the accuracy at least indoors.

It is emphasized that the present invention can be varied in many ways, of which the alternative embodiments as presented are just a few examples. These different embodiments are hence non-limiting examples. The scope of the present invention, however, is only limited by the subsequently following claims.

According to some embodiments of the present invention, the exact order of the steps of the methods related to providing call service for a call can be changed and some steps can even be deleted without deferring from the scope of protection of the present invention. For instance, the step 506 may be deleted in some embodiments in which additional position information is known to be available to the MSC, being one example of a switching unit.

It is thus easy to understand that the embodiments of the present invention comes with a number of advantages of which a few are:
- that specific geographical areas may be defined as local policy areas and that this may be done by the network operators;
- that the network operator is able to save network resources by managing call service, for instance by restricting or even preventing call establishment to and from these areas;
- that call prevention may be applied to both home subscribers and inbound roaming subscribers; and
- that an IN service may be used to determine whether the position area is eligible for a local policy, since said IN service may be applied in combination with other IN services such as Virtual private Network (VPN) or pre-paid call establishments.

The invention claimed is:

1. A method in a switching unit of switching calls involving an electronic communication device in an electronic communications system, the method comprising the steps of:
   obtaining position area information, including a cell identifier (ID) of a serving cell for the electronic communication device in response to a call service request from the electronic communication device,
   determining whether the cell ID is included in a list of cells eligible for a local policy,
   determining whether further position information for the electronic communication device is required or not, based on the cell ID;

upon determining that the cell ID is included in the list of cells eligible for the local policy, and that further position information is not required, sending to a service control unit a message indicating that the position area is associated with the local policy and obtaining instructions from the service control unit for the call service;

upon determining that further position information is required, obtaining from a base station controller further positioning information of the electronic communication device that better defines location of the electronic communication device within the serving cell, and sending to the service control unit a report message that contain the further position information, the report message is configured to cause the service control point to perform further local policy eligibility determination for the electronic communication device using the further position information;

and based on the further eligibility determination by the service control unit, obtaining instructions from the service control unit for implementing the call service, wherein the local policy defines the call service for the calls from or to areas where the call service is to be employed.

2. The method of switching of call service according to claim 1, wherein the step of sending a message comprises sending a message comprising GPS or MPS related position information associated with the location of the electronic communication device.

3. A switching unit being arranged for switching calls involving an electronic communication device, the switching unit comprising:

a processor;

a first application unit operable on the processor of the switching unit being arranged to obtain position area information, including a cell identifier (ID), of a serving cell for the electronic communication device in response to a call service request from the electronic communication device and determine whether the cell ID is included in a list of cells eligible for a local policy, and a second application unit operable on the processor of the switching unit and operatively connected to the first application unit, and adapted to be connected to a service control unit, the second application unit being arranged to determine whether further position information is required or not, based on the cell ID, send to the service control unit a message comprising information indicating that the position area is associated with the local policy and obtain instructions from the service control unit for the call service, upon determining that the cell ID is included in the list of cells eligible for the local policy and that further information is not required, upon determining that further position information is required, obtain from a base station controller further positioning information of the electronic communication device and, send to the service control unit a report message that further position information, the report message is configured to cause the service control point to perform further local policy eligibility determination for the electronic communication device using the further position information and based on the further eligibility determination by the service control unit obtain instructions from the service control unit for the call service, wherein the local policy defines the call service for the calls from or to areas where the call service is to be employed.

4. The switching unit according to claim 3, wherein the second application unit is further arranged to send a message comprising GPS or MPS related information associated with the location of the electronic communication device.

5. A method in a service control unit of controlling a call service for calls involving an electronic communication device, where the electronic communication device is located within a position within a serving cell of a wireless electronic communications system, the method comprising:

receiving from a switching unit a message comprising information indicating that a cell identifier (ID) of the serving cell of the electronic communication device is included in a list of cells eligible for a local policy, determining whether an entirety of the serving cell is associated with the local policy, upon determining that the entirety of the position area is not associated with the local policy, requesting further position area information from a network location server, making a further positioning by using the further position area information to achieve a better defined position information of the electronic communication within the serving cell, and determining whether an entirety geographical location corresponding to the better defined position information is associated with the local policy, and supplying call handling policy instructions comprising the local policy to the switching unit upon determining that the entirety of the better defined position area is associated with the local policy, wherein the local policy defines the call service for the calls from or to areas where the call service is to be employed.

6. The method of controlling a call service according to claim 5, further comprising a step of retrieving policy information associating the further position with at least one geographical area associated with the local policy.

7. The method of controlling a call service according to claim 5, wherein the step of receiving a message comprises receiving a message comprising GPS or MPS related position information associated with a location of the electronic communication device.

8. The method of controlling a call service according to claim 5, further comprising supplying normal call handling instructions to the switching unit if the entirety of the serving cell is not eligible for the local policy.

9. A service control unit being arranged for controlling a call service for calls involving an electronic communication device, where the electronic communication device is located within a position within a serving cell of an wireless communication system, the service control unit including a processor being arranged to receive from a switching unit a message comprising information indicating that a cell ID of the serving cell for the electronic communication device is included in a list of cells eligible for a local policy, determine whether an entirety of the serving cell is associated with the local policy, upon determining that the entirety of the serving cell is not associated with the local policy request further position area information for the electronic communication device from a network location server, make a further positioning by using the further position area information to achieve a better defined position information of the electronic communication within the serving cell, and determine whether an entirety of the better defined position information is associated with the local policy, and supply call handling policy instructions comprising the local policy to the switching unit upon determining that the entirety of the better defined position area is associated with the local policy, wherein the local policy defines the call service for the calls from or to areas where the call service is to be employed.

10. The service control unit according to claim 9, wherein the processor is further being arranged to retrieve policy information associating the position information with at least one area associated with the local policy.

11. The service control unit according to claim 9, wherein the processor is further being arranged to receive from the switching unit a message comprising GPS or MPS related position information associated with a location of the electronic communication device.

12. The service control unit according to claim 9, wherein the processor is further being arranged to supply normal call handling instructions to the switching unit if the entirety of the serving cell is not eligible for the local policy.

13. An electronic communication system for providing a call service for calls involving an electronic communication device, the system comprising:

a switching unit and a service control unit, wherein the switching unit being arranged to be operatively connected to an electronic communication device and adapted to be operatively connected to the service control unit, the switching unit including a processor adapted to obtain position area information, including a cell ID, of a serving cell for a location of the electronic communication device response to a call service request from the electronic communication device, determine whether the cell ID is included in a list of cells eligible for a local policy, determine whether further position information for the electronic communication device is required or not, send to the service control unit a message comprising information indicating that the position area is associated with the local policy, upon determining that the cell ID is included in the list of cells eligible for the local policy and that no further position information is required, and obtain instructions of the local policy for employing the call service, for which a better defined position area of the electronic communication device is associated with the local policy if the further position information is required, and the service control unit including a processor being arranged to receive the message comprising information indicating that the position area of the electronic communication device is associated with the local policy, upon determining that the cell ID is included in the list of cells eligible for the local policy, determine whether an entirety of the serving cell is associated with the local policy, request further position area information for the electronic communication device from a network location server, perform a further positioning by using the further position area information to achieve the better defined position information of the electronic communication within the serving cell determine whether an entirety of the geographical area indicated by the better defined position information is associated with the local policy, and supply the local policy to the switching unit upon determining that the entirety of the geographical area indicated by the better defined position information is associated with the local policy, such that the switching unit can employ the call service by applying the local policy, wherein the local policy defines the call service for the calls from or to areas where the call service is to be employed.

\* \* \* \* \*